Feb. 12, 1963　　　C. L. JACOBS ETAL　　　3,077,269
MATERIAL HANDLING SYSTEM
Filed Aug. 10, 1959　　　　　　　　　　　　　　5 Sheets-Sheet 4

INVENTORS
CLYDE L. JACOBS
BY WESLEY R. SOUPLY

ATTORNEYS

United States Patent Office 3,077,269
Patented Feb. 12, 1963

3,077,269
MATERIAL HANDLING SYSTEM
Clyde L. Jacobs, 111 Forest Ave., Fairfax, Calif., and Wesley R. Souply, 123 Bucareli Drive, San Francisco, Calif.
Filed Aug. 10, 1959, Ser. No. 832,776
4 Claims. (Cl. 214—15)

This invention generally relates to a system for handling rollable articles mechanically rather than manually. More particularly, the invention relates to a handling system and method for rapidly, mechanically and automatically handling cylindrical rollable articles, such as rolls of paper and the like, and to a transportation vehicle, particularly of the seagoing waterborne type, which is particularly adapted for use with the handling system and method of this invention and which, because of its special construction, precludes the need for manual cargo handling during loading or unloading thereof.

While in the last few decades great strides have been taken in the mechanization of handling and transporting bulk commodities, such as metal ore and petroleum products, little if any change has occurred in the method or system of handling and transporting so-called break-bulk cargoes; that is, cargoes composed of individual articles such as rolls, drums, cases or the like. As a general principle, break-bulk cargoes are loaded and unloaded from vessels in much the same manner today as that employed many years ago. This situation may be attributed to several reasons. Freight carrying vessels are designed for logistic support of armed forces in time of war and must be adapted to handle any type cargo. Because such freighters travel to various ports throughout the world, their ability to accommodate any type cargo which may be discharged or picked up at such ports takes on great importance. As a result, such vessels rely on conventional winches, booms, nets, hooks, slings and the like to load or unload all types of cargo from large storage holds provided therein.

Because of spiralling labor costs, steadily increasing port costs, and high cargo damage losses which result from present methods of handling cargoes, it is highly desirable that mechanical means approaching automation be devised so that manual handling of cargo may be minimized, if not entirely eliminated, so that labor costs and attendant cargo damage losses are curtailed. Similarly, vessel loading and unloading must be speeded up so that the vessels need not stay in port any longer than a minimum time, so that port costs may be reduced and more trips made in a given time period.

The above noted cost factors have become particularly important in the transportation of rolls of paper, such as newsprint and the like. Such rolls generally are produced in one country or area of a country and transported, principally by water, to other countries or areas thereof in which they are to be used. Because Canada, the Scandinavian countries, and the northwestern part of the United States are the principal areas in which newsprint and like paper products are produced for use in other countries or areas, transportation and handling costs to a large extent determine the ultimate price of such products and articles made therefrom.

Under present handling systems, newsprint paper rolls and like articles generally are transported to and from warehouses and docks to vessels, rail cars and the like by "grab trucks," which are small vehicles provided with movable arms which grasp one or two paper rolls at a time for movement thereof. In loading a typical vessel with paper rolls, grab trucks are employed to move the rolls from the storage area on the dock or warehouse to the side of the ship so that the rolls may be grasped singly or in pairs by various winch and sling constructions which pick up the rolls and deposit the same into the hold of the vessel. Rough handling during this operation frequently results in roll damage.

Inside the vessel a crew of longshoremen are employed to move the rolls from beneath the central hatch opening to the various outlying areas of the ship's hold in which they will be stored during transportation. While grab trucks are sometimes employed within the ship's hold, quite frequently the longshoremen move the rolls individually and manually by rolling or hand trucking the same into their desired storage locations. The rolls generally are stored during shipment on their ends.

In unloading a ship, this procedure is reversed with the longshoremen moving the rolls to be unloaded under the hatch opening from which they are withdrawn singly or in pairs by hooks or slings and transported to dockside at which time they are subsequently picked up by grab trucks and moved to a storage area or to a waiting railway car or truck for subsequent transportation to the ultimate consumer.

Besides being very time consuming, this piece-by-piece common handling method is expensive because of high labor costs coupled with damage losses which result from the many times the individual rolls are handled. For example, it has been found that with vessels operating in the coast trade between Oregon and California, labor costs have run as high as 60% of the gross revenue produced by a given vessel. This is due to the fact that loading and unloading crews frequently number as many as thirteen men per hold.

It should also be noted that the principal paper producing regions are in areas in which precipitation is heavy, particularly during the winter months. During periods of heavy rain or snow, large canvas covers, called "hatch tents" are rigged over hatch openings of conventional vessels in an attempt to keep out as much moisture as possible. Water damage to paper rolls frequently results even if such hatch tents are employed, however.

Because each paper roll moved in the above described manner is handled as many as twelve or more times from the time it leaves the paper making machine until it reaches the customer's warehouse, damage to the individual rolls frequently occurs. When the cost of damaged rolls is added to the high labor costs and the high dock fees presently encountered by vessels, handling costs for the paper rolls reach unduly large figures.

The present invention involves a system, method and vessel intended to reduce the high cost of loading, transporting and unloading newsprint or other rollable paper or like products in that the same relates to a rapid mechanical and automatic method of handling the rolls from the time they leave the paper making machine until they are delivered to a warehouse from which they may be removed for transportation to the ultimate consumer's place of business.

Accordingly, objects of the present invention include the provision of a paper roll handling system by means of which paper rolls may be handled in quantity rapidly and without damage so that the same can be loaded or unloaded from a transporting vessel in the minimum necessary time; the provision of a method for carrying out vessel loading and unloading; the provision of a particular type vessel well suited for use with the system and method of this invention; the provision of particular type storage areas in the vessel adapted to receive a plurality of paper rolls and maintain the same securely therein during transportation thereof; the provision of a particular type storehouse usable in the system in which a supply of paper rolls may be accumulated prior to or subsequent to their transfer to or from an adjacent vessel; and the provision of a conveyor arrangement on the vessel cooperable with a conveyor arrangement of a storehouse by means of which large numbers of rolls may be rapidly and safely handled.

These and other objects will become apparent from considering the following specification in which reference is directed to the accompanying drawings.

While this invention relates primarily to handling of cylindrical paper rolls and like rollable articles, it should be understood that the same is equally well suited for use in handling other rollable articles, such as barrels of oil or the like. In addition, while reference is hereafter directed primarily to waterborne vehicles, such as ships and cargo barges, the invention also may be employed with other type cargo vehicles, such as railroad cars or the like.

As pointed out hereinbefore, prior art handling methods for newsprint paper rolls leaves much to be desired because of the requisite expensive manual handling operations employed, the roll damage which accompanies manual handling, and the lack of speed with which a given vessel can be loaded or unloaded because of such manual operations. The present invention is intended to correct the shortcomings of the prior art and is directed to a mechanical handling system and method by means of which large numbers of cylindrical paper rolls may be automatically and rapidly loaded on, transported by, and unloaded from a specially designed vessel so that labor costs may be minimized, roll damage eliminated or materially reduced, and loading and unloading time substantially shortened.

Before discussing details of this invention, the same will be briefly summarized. The handling system of this invention is designed so that cylindrical paper rolls are at all times during loading, transportation and unloading maintained on their peripheries or sides as opposed to their flat ends so that the same are rollable in response to the effects of gravity. This is in opposition to prior art systems in which rolls are primarily handled and stored in vessels on their flat ends. A vessel is provided which includes a plurality of separate cargo spaces each of which is vertically partitioned by a series of flat decks into a plurality of separate 'tween deck storage areas each of which is only slightly higher than the diameter of the rolls to be stored therein. Each of the cargo spaces includes a vertical well which has vertically movable therein an elevator mechanism for moving a "log" or row of end-to-end rolls to or from a given storage area. The elevator mechanism for each cargo space desirably extends substantially the full distance across the cargo space so that a plurality of rolls may be simultaneously moved thereby.

Extending across the top deck of the vessel are a plurality of transverse transfer conveyors equal in number to the number of cargo spaces of the vessel, with the conveyors being positioned adjacent the vertical wells in which the respective elevator mechanisms are movable. Each entrance well is at an end of a cargo space as opposed to prior art vessels in which the cargo hatch is provided in the middle of a given hold.

Each of the transverse conveyors are operatively connectable with a section of the conveyor arrangement of the storehouse alongside which the vessel is to be tied up during roll loading or unloading. The storehouse conveyor arrangement may take many suitable forms so long as it is capable of accommodating large numbers of rolls rapidly and automatically so that the same may be discharged from the vessel or supplied thereto without requiring manual handling thereof or the like.

The storehouse conveyor arrangement includes a distribution section which extends substantially the full length of the storage deck thereof, which deck is inclined relative to the horizontal and relative to the plane of the conveyor so that paper rolls may be moved by the force of gravity either toward or away from the conveyor section extending along the deck, depending upon whether the storehouse is at the loading or discharge end of the vessel's travel. By providing suitable electrical control means which are well known in the conveyor art, movement of rolls into or out of the storehouse in a given predetermined manner towards or away from the vessel tied adjacent thereto may be rapidly and easily accomplished. Likewise, by employing suitable electrical control mechanism on the respective elevator mechanisms in each of the cargo spaces of the vessel logs or rows of paper rolls may be presented to or removed from a given storage area in a given cargo space rapidly and easily.

Means are provided in the vessel for trimming the same so that the bow or stern of the vessel may be lowered and maintained below its normal position so that a predetermined downward angle of inclination in a given forward or aft direction may be imparted to each of the separate decks of the cargo spaces so that logs of rolls may roll under the force of gravity either toward or away from the respective elevator mechanisms so that the storage spaces may be filled with a predetermined number of rolls. For example, by trimming the ship so that the bow thereof is lower than normal, a forward inclination is imparted to each of the decks which define the 'tween deck storage areas. As a result, if a log of rolls is presented to a given storage area at the rear thereof and released, the same will roll under the force of gravity towards the forward end of the storage area until the same is halted by striking a bulkhead of the cargo space or a similar log of rolls previously inserted into the storage area.

Desirably, means are provided to engage opposite ends of the various logs of paper rolls in the various storage areas so that lateral shifting thereof during transportation is precluded. Also, gate means are provided adjacent the vertical well of each cargo space in which the respective elevator mechanisms travel to maintain the rolls in the storage areas during transportation.

Newsprint and other paper rolls are produced in various sizes; for example, newsprint rolls may be 30 to 74 inches in length, with the average roll being approximately 60 inches long. The diameters of such rolls vary from 30 to 40 inches with a 40 inch roll, 60 inches long weighing between 1500 and 2000 pounds. A vessel of the present invention which is approximately 550 ft. long, 65 ft. wide and which has seven 'tween deck storage areas in each of six cargo spaces, may accommodate as many as 6000 paper rolls simultaneously. With the mechanical conveyor handling systems presently available, a vessel of this type can be unloaded in about one-tenth or less time than that normally required for unloading a comparable cargo from a ship by employing manual labor, slings or hooks and grab truck.

In addition, because of the elevator mechanism employed in each cargo space, one man to control the elevator for each cargo space can replace the thirteen man crew presently employed in each hold of a cargo ship. The resultant savings in loading and unloading time, when coupled with the substantial reduction in labor costs, makes the present roll handling system particularly desirable.

Figure 1:
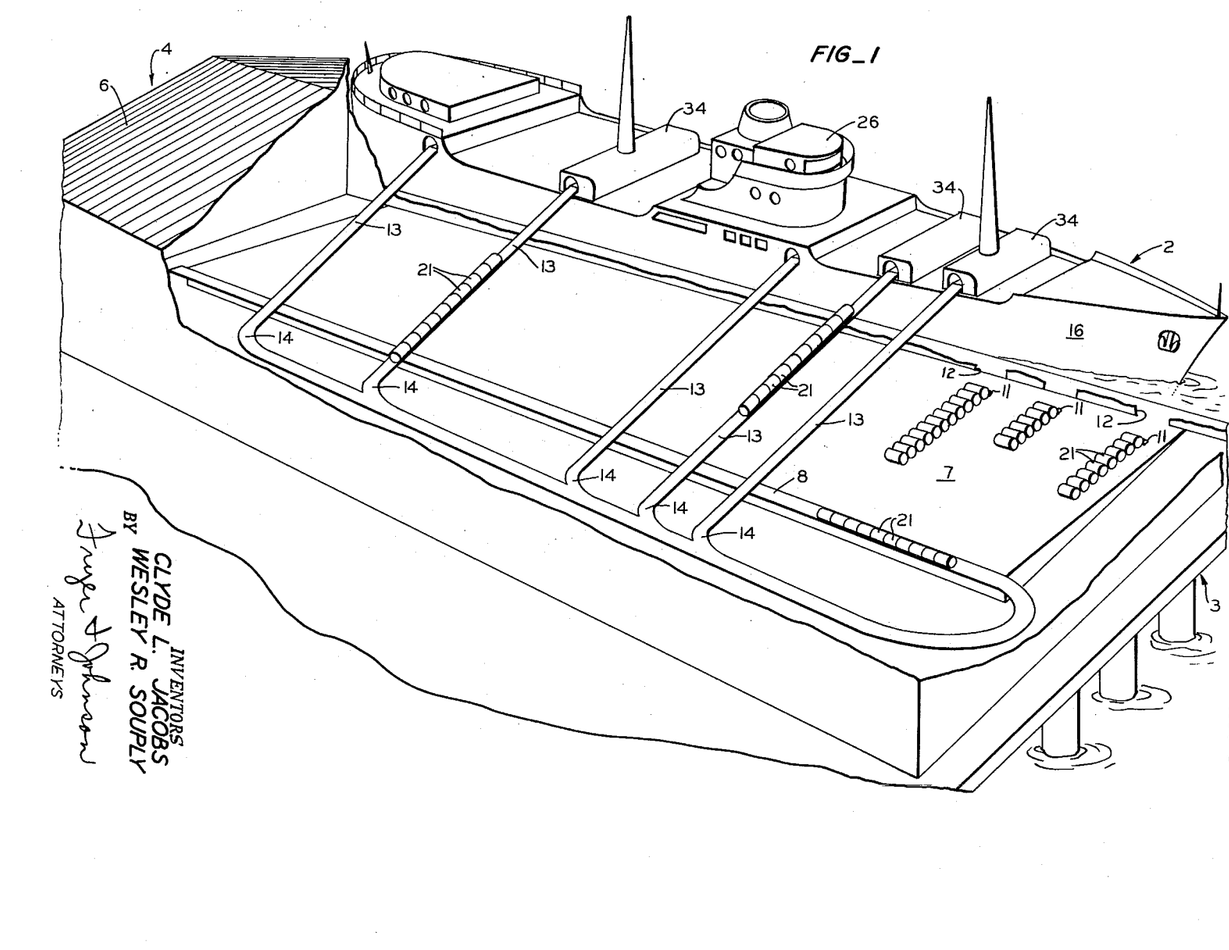
FIG. 1 is an isometric schematic view showing a vessel of this invention tied up adjacent a storehouse into which quantities of paper rolls or the like are being mechanically discharged from the vessel.

Referring to the accompanying drawings, FIG. 1 schematic illustrates a vessel 2 well suited for use with the present system tied up alongside a dock 3 on which is located a storehouse 4 of the type involved in the invention. Because the articles involved are paper rolls which may be adversely effected by moisture, it is desirable that storehouse 4 be provided with a covered roof 6 so that the rolls are protected from the elements. Depending upon the climate of the area in which the storehouse is located, side walls may be employed or not employed with the storehouse as desired. Also, as will be discussed further hereinafter, the conveyors extending between the storehouse and the vessel by which paper rolls are moved desirably are covered or enclosed so that the entire loading or unloading operation may be carried out without exposing the paper rolls to any inclement weather, such as rain or snow.

The storehouse embodiment shown is of a construction of the type intended to accumulate paper rolls after the same have been discharged from the vessel 2 which has picked up the same previously at a first storehouse at a first station and transported the same to storehouse 4 at a second station remote from the first. Desirably, the storage deck 7 of the storehouse is inclined relative to the horizontal as shown best in FIG. 3. Extending the length of the storage deck 7 is a start-stop distribution conveyor section 8 of any suitable construction along which rolls from vessel 2 may be carried for storing in predetermined bays of the storehouse.

Figure 3:
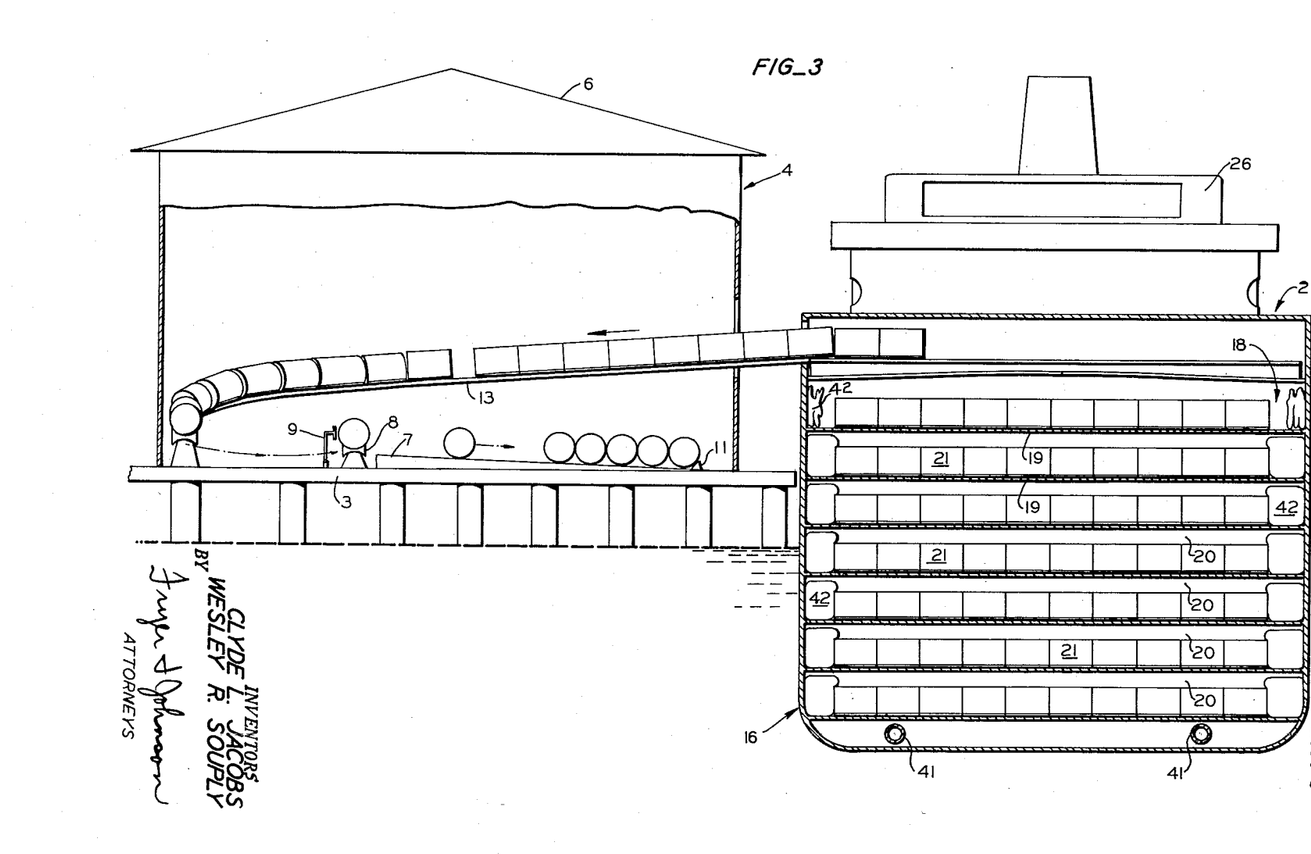
FIG. 3 is a vertical section through the vessel and the storehouse of FIG. 1 illustrating the manner in which "logs" or rows of paper rolls are moved from the vessel into the storehouse.

As schematically shown in FIG. 3, desirably kick-off arms 9 of any suitable type are provided at predetermined locations along the length of distribution conveyor section 8 for moving predetermined paper rolls from conveyor section into the inclined storage deck 7 of the storehouse.

Upon a roll being kicked off the conveyor, the same rolls under the force of gravity down the inclined deck until it strikes a prepositioned chock or stop 11 located adjacent the wall of the storehouse. In this manner rolls discharged from the vessel 2 may be positioned in a predetermined location with similar size or quality rolls for subsequent removal from the storehouse by truck or the like to the ultimate consumer's plant.

In this connection, suitable door openings 12 (FIG. 1) are provided through the storehouse wall through which paper rolls may be moved by gravity onto the trucks positioned outside the storehouse on dock 3.

Although in the drawings as illustrated only a single storage deck 7 is provided for the storehouse, it should be understood that more than one storage deck may be provided and the same may be vertically arranged to conserve space. Similarly although only one roll distribution conveyor section 8 is shown extending the length of the storehouse, it should be understood that the illustration of FIG. 1 is intended to be schematic and that any suitable conveyor arrangement may be employed to serve a plurality of storage decks if the same is found desirable.

Various conveyor systems which are automatically and electrically controllable by means of a console control panel operable by a single man are well known in the conveyor art and the particular type conveyor employed for transporting rolls within the storehouse is not intended to be a specific part of the invention, any suitable automatic conveyor arrangement being usable so long as it is capable of handling large numbers of paper rolls rapidly and without damage.

While in FIGS. 1 and 3, the storehouse 4 has the storage deck 7 thereof sloping downwardly away from the conveyor section 8 thereof, it should be understood that in a similar storehouse provided at a loading station, the storage deck would slope towards the conveyor so that the force of gravity may be employed to load rolls directly onto the conveyor section extending the length of the storehouse for ultimate transportation onto the vessel positioned adjacent thereto.

Desirably the conveyors chosen for moving rolls between the respective loading and unloading storehouses and the vessel are of the so-called saddle type which are defined by a series of separate spaced concave rollers which define a concave conveyor surface engageable with the rounded peripheries of the respective paper rolls so that lateral shifting of the paper rolls from the conveyor section is precluded. Note FIG. 3.

As schematically illustrated in FIG. 1, a series of generally inclined conveyor sections 13 are operatively connected with the conveyor section 8 mentioned previously. While various arrangements are available by means of which cylindrical articles such as paper rolls may be made to change directions as they are moved along a conveyor, curved conveyor sections such as shown at 14 in the conveyor arrangement may be employed. Alternatively, rotating turn tables may be employed at such locations to change direction of movement of the rolls discharged from or presented to the vessel. Again it is to be noted that the function performed by the particular conveyor arrangement chosen for transporting rolls from or to the vessel from or to a storehouse adjacent thereto is the important factor with the exact conveyor arrangement chosen being a matter of choice to be determined by the size of the rolls employed, the size of the loading operation, the position of the vessel relative to the storehouse and the like. It should be borne in mind, however, that electrically controlled conveyor systems are available by means of which a single man can control the flow of articles simultaneously from several separate sources and direct the articles to any predetermined location. Such systems include "memory" arrangements whereby given articles may be segregated automatically by size, quality, style and the like.

In the embodiment schematically shown in FIG. 3, the generally horizontal conveyor sections 13 of necessity have a downward slope from the top deck of the vessel 2 to the floor of the storehouse. The angle of inclination of conveyor sections 13 can be controlled by their length however. Conveyor sections 13 may be of the well known gravity type, which are not mechanically driven, when employed for ship unloading. However, in the reverse situation when rolls are being loaded onto the vessel, the conveyor sections 13 would be driven to raise the rolls from the floor of the storehouse to the upper deck level of the vessel. As noted in the drawings, a separate conveyor section 15 which extends generally parallel to the aforementioned section 8 extends parallel thereto and connects section 8 operatively to the series of inclined sections 13 connected to the vessel. Under given circumstances, sections 13 could be directly connected to section 8 if so desired.

Figures 2, 10:
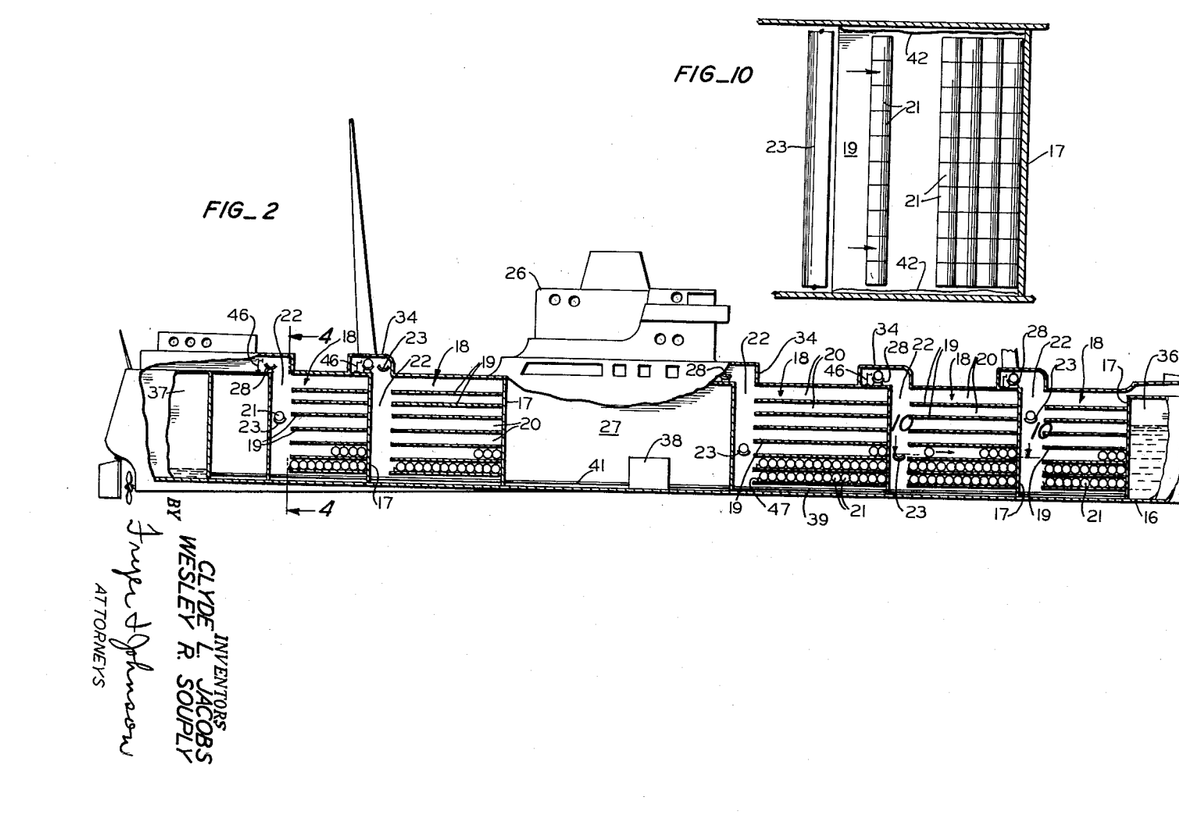
FIG. 2 is a partial longitudinal section through the vessel illustrating internal details thereof and showing the manner in which rolls are loaded on their sides into the respective cargo spaces.
FIGURE 10 is a plan view of an elevator and a deck showing rolls being rolled from the elevator into stored position.

Referring to FIGS. 1 to 3, the vessel 2 illustrated comprises a hull 16 which is divided by series of vertical bulkheads 17 into a plurality of separate cargo spaces 18. Each of the cargo spaces 18 is vertically partitioned by means of a series of spaced decks 19 into a plurality of so-called 'tween deck storage areas 20, each of which is intended to receive a plurality of individual paper rolls 21 therein. The height of each storage area is only slightly greater than the diameter of the largest roll to be stored therein so that the rolls are rollable therein.

While five cargo spaces 18 are illustrated in the vessel embodiment shown, it should be understood that any suitable number may be employed depending upon the size of the vessel.

Figure 4:
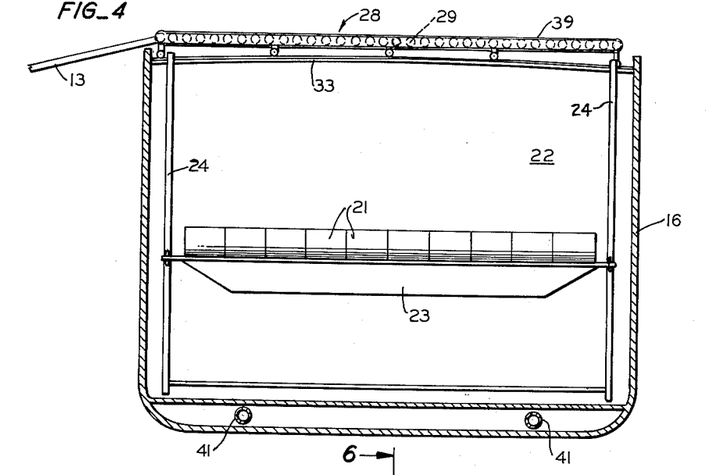
FIG. 4 is a vertical section through the vessel taken in the plane of line 4—4 of FIG. 2 and showing the elevator mechanism thereof.

Each cargo space 18 includes a vertical well 22 extending the full distance thereacross at one end thereof in which a concave saddle type elevator platform 23 is vertically movable. As shown in FIG. 4, elevator platform 23 extends substantially the full distance across its respective cargo space 18 and the well 22 thereof so that a row or log of paper rolls 21 may be vertically moved thereby as a unit.

Various types of mechanisms may be employed for raising and lowering the elevator platform 23 and in the embodiment shown the platform is mounted for movement on spaced guide rails 24 extending vertically in the cargo space well for guiding the elevator thereon as shown in FIG. 4. Any suitable means such as cables, pistons or the like may be employed for vertically moving the platform 23 on rails 24.

While in the embodiment illustrated the elevator is movable in the aft or rear portion of each cargo space, if desired the same could be positioned in the forward end of each cargo space. While a straight line, up-down type elevator mechanism is illustrated with the vessel embodiment shown, other mechanisms could be employed, such as a rotatable ferris wheel type which moves continuously about sprockets spaced from each other. So long as the elevator chosen is capable of handling a plurality of up to ten, twelve or more rolls simultaneously, it is usable in the system of this invention and its exact construction is a matter of choice.

As shown in FIG. 2, the central area of the vessel is surmounted by superstructure 26 which includes the bridge from which the vessel is controlled, the crew's quarters and the like. The internal central area 27 of the vessel houses the operating mechanism of the vessel, such as its turbines and the like.

Each cargo space 18 adjacent the top of its vertical well 22 is provided with transfer conveyor means 28 which extends substantially the full distance transversely across the vessel. Each such conveyor may take any given form so long as it is capable of simultaneously moving a plurality of heavy paper rolls.

Figure 5:
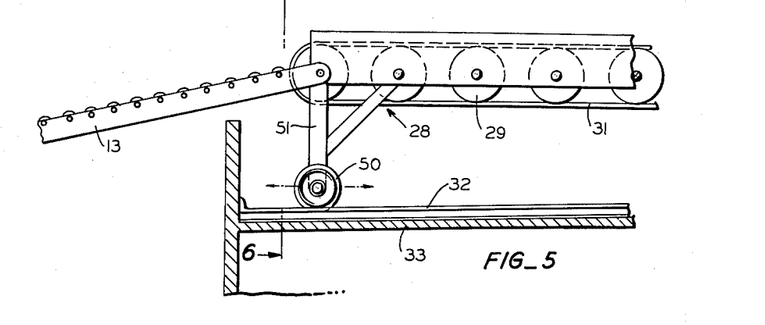
FIG. 5 is a side elevation of a transfer conveyor positioned for movement relative to the vessel deck.
Figure 6:
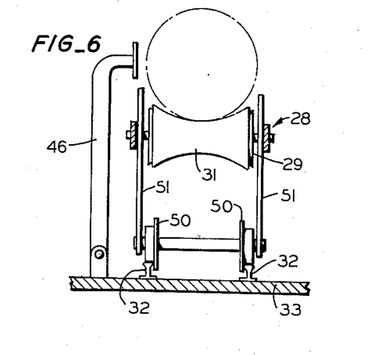
FIG. 6 is an end view of the conveyor of FIG. 5 taken in the plane of line 6—6 thereof.

In the embodiment illustrated, each conveyor 28 comprises a series of concave rollers 29 (FIGS. 4 and 5) over which passes an endless belt 31 which provides a smooth saddle type seat for the paper rolls as shown in FIG. 6. Conveyor 28 may be mounted on tracks 32 on the upper deck 33 of the vessel so that the same is movable laterally of the vessel for a purpose to be described.

Referring again to FIGS. 1 and 2, each conveyor 28 desirably is enclosed in a hatch housing 34 which protects the same and the cargo in the cargo spaces from inclement weather during loading and unloading and during sea voyages. Also, as noted previously, those portions of the respective conveyor sections 13 which extend beyond the storehouse wall and are operatively connected to conveyors 28 in the covered hatch housings 34 may also be enclosed or covered in any suitable manner so that rolls may be loaded or unloaded from the vessel without being exposed to bad weather.

Vessel 2 includes means for trimming the same so that the bow or stern thereof may be lowered a predetermined controlled amount to facilitate roll loading and unloading. Such trimming means comprises a forward trim tank 36 and an aft trim tank 37 (FIG. 2). A trim tank control pump 38 desirably is mounted amidships and is connected by means of parallel fore and aft ballast lines 39 and 41, respectively, to the fore and aft trim tanks. By employing the pump 38 in a well known manner, fluid such as sea water or the like may be pumped into or out of the respective tanks to impart and maintain any desired fore or aft angle of inclination to the vessel as may be required to facilitate loading or unloading thereof.

Referring to FIG. 3, each 'tween deck storage area 20 has provided along opposite sides thereof means for maintaining the paper rolls in place during shipment. Such means desirably comprises inflatable lengths of rubber or like dunnage 42 secured to the inside of the storage areas. As shown in FIG. 10, dunnage 42 extends the length of the respective storage areas and, when deflated, leaves ample room for a log or row of rolls to be moved therebetween. However, when inflated against opposite ends of the respective rows of rolls, the dunnage forces the rolls endwise more securely against each other and maintains the same securely in place to preclude shifting thereof during movement of the vessel. In this manner, stability of the ship may be maintained when loaded. Each length of dunnage is connected to a common air source so that pressure is uniform throughout the system.

A typical loading and unloading operation of a single cargo space 18 will now be described but it should be understood that loading and unloading of the respective cargo spaces of the vessel desirably is carried out simultaneously to facilitate rapid cargo handling.

If a storehouse is located adjacent the paper making machine in a manufacturing plant, individual newsprint rolls may be moved by suitable mechanical conveyors directly from the paper rewind machine to the storehouse. Generally, identification material is placed on the rolls by the manufacturer which indicates weight, style, consignee and the like. Thereafter, the rolls may be fed by gravity as required to a pick up conveyor section extending along the inclined storage deck of the storehouse. The rolls are carried by the conveyor arrangement connected between the storehouse and the vessel into a covered hatch housing 34 of the vessel. As noted previously, because electrical conveyor controls are well known, a given roll may be loaded into a given cargo space according to a prearranged plan. A dockside supervisor is able to automatically insure that a sufficient number of rolls are always available at the respective hatch housings.

When the individual rolls are carried to the vessel, the same are moved automatically onto the transverse vessel conveyor 28 on the upper deck 33 of the vessel until a plurality of ten, twelve or more rolls, depending upon the roll size, are accumulated on the conveyor. If desired, roll accumulation may be effected in the storehouse. The elevator platform 23 in the meantime has been positioned adjacent the conveyor 28 as shown in the second aft cargo space of FIG. 2. Thereafter suitable kick-off means 46, schematically illustrated in FIGS. 2 and 6, which like conveyor 28 and elevator 23 extends substantially the full distance across the vessel, kicks off the entire row of rolls onto the waiting elevator. Alternatively, conveyor 28 may be rotated in a suitable manner about its longitudinal axis to roll the row of rolls onto the waiting elevator platform. Thereafter, the elevator is lowered through well 22 to a position opposite the mouth of a given predetermined 'tween deck storage area 21 and the log or row of rolls discharged therefrom by tilting the elevator to roll the log therefrom. Alternatively, suitable means may be employed with the elevator for kicking the log therefrom onto the receiving deck which defines the storage area bottom.

Because the ship previously has been trimmed by pumping fluid into the fore tank 36, each deck 19 in inclined relative to the horizontal and the log of rolls discharged by the elevator will roll forwardly under the force of gravity as shown in FIG. 10 until the same strikes the bulkhead 17 of the cargo space or until the same strikes a stick of previously positioned rolls. Because the rolls are discharged simultaneously from the elevator because of their weight and the fact that they are in end-to-end engagement, a log of rolls will move as a unit to its desired storage location without the individual rolls becoming askew, as shown in FIG. 10. If desired, a suitable buffer material may be positioned between the bulkhead and the first log of rolls to absorb the shock of the same striking the bulkhead.

By repeating this operation, that is by positioning the elevator 23 adjacent the transverse conveyor 28 on the main deck to alternately receive logs of rolls and by positioning such logs into a predetermined storage area, such storage area may be filled as schematically shown in FIG. 2. Desirably suitable gate or chock means 47 are positioned adjacent the mouth of each storage area to preclude reverse movement of the logs of rolls into the vertical well 22 during transportation of the rolls. Each gate or chock 47 may be retracted into the deck automatically by suitable electrical means actuated by the elevator 23 when the same is positioned opposite the gate. During loading, the desired vessel trim angle is maintained by pumping fluid as needed into or out of the respective trim tanks.

After a given storage area is filled, the dunnage 42 positioned on opposite sides thereof is inflated so that the respective rolls are securely maintained in a predetermined storage location during transportation thereof.

When the ship is filled with a predetermined number of paper rolls, the vessel is restored to its normal trim and the rolls are transported to a second station of the general type shown in FIG. 1 which includes a storehouse intended to receive the rolls from the ship.

At such second station, the vessel is trimmed so that it has an aft angle of inclination so that the tendency of the rolls is to move toward the vertical well 22 of each cargo space and the elevator mechanism 23 movable therein. Movement into the well is precluded by the gate 47 mentioned previously.

Upon deflation of the dunnage, the respective logs may be sequentially transferred to an elevator 23 positioned opposite a given storage area. The retaining gate or chock 47 is retracted periodically thereby allowing a single log of rolls to move onto the elevator, after which the gate or chock returns automatically to its restraining position to preclude movement of further rolls. As each log is removed, the remaining logs advance in step fashion due to gravity toward the vertical well. The log of rolls discharged is moved by the elevator upwardly and is discharged by tilting the elevator platform or by suitable kick-off mechanism onto the transverse conveyor 28 extending across the vessel deck. As noted previously, conveyor 28 is operatively connected with the conveyor sections 13 in the storehouse so that logs of rolls may be rapidly discharged from the vessel. By repeating the above described operation, complete unloading of the vessel may be rapidly accomplished.

On the return voyage for another load of paper rolls, the cargo space may be employed for other cargoes if so desired. If not, trim tanks 36 and 37 desirably are filled with fluid to impart more stability to the vessel during the return trip.

After rolls unloaded from the vessel have been positioned in a predetermined manner in the storehouse as shown in FIG. 1, the same may be loaded by gravity or the like onto a vehicle and transported to the ultimate consumer. In this manner, a given paper roll may be moved automatically from its point of manufacture on a rewinding machine to the ultimate consumer without requiring manual handling thereof or handling by grab trucks or the like until it reaches the consumer, or at least until the same is loaded on a truck at the storehouse for transportation to the consumer.

Because vessels of the type described generally are used in coastal waters, loading or unloading thereof must be carried out under varying tide conditions. Accordingly, the conveyor arrangement chosen desirably includes means for compensating for changes in water level due to tide conditions. In addition, means desirably is provided for compensating for changes in the draft of the ship as the same is loaded and unloaded. That is, because of tide conditions and continuously changing weight of cargo in the vessel as the same is loaded and unloaded, the vessel will rise or fall relative to the level of the dock to which it is tied. To compensate for this condition, the conveyor arrangement shown in FIGS. 5 and 6 may be employed.

As described previously, each transverse conveyor 28 extends across the main deck 33 and desirably is movably mounted on tracks 32 by means of rollers or wheels 50 attached to struts 51 depending from the conveyor. In this manner as the ship upper deck level rises or falls relative to the dock level, the conveyor 28 is free to move in either direction across the vessel deck to compensate for up or down movement of the vessel. As a result, the angle of inclination of the conveyor section 13 will be modified automatically to compensate for change in vessel deck level due to changes in ship draft or change in tide conditions.

Figure 7:
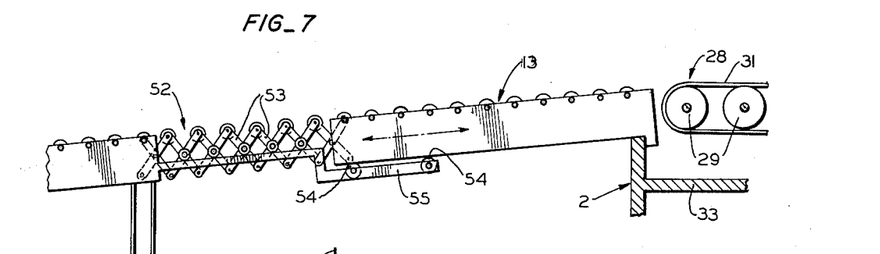
FIG. 7 is a side elevation of the conveyor section connecting the vessel with the storehouse.

An alternate construction for this same purpose is shown in FIG. 7. In such construction the generally horizontal conveyor section 13 which extends between the vessel and the storehouse is provided intermediate its ends with an expandable and retractable accordion section 52 defined by series of hingedly connected cross-links 53. By means of rollers 54 on one portion of the conveyor which are movable over a bearing plate 55 on another portion of the conveyor relative sliding movement between the conveyor portions which make up the expansible connection may be effected. As the tide or vessel draft changes, section 13 of the conveyor arrangement may be automatically extended or retracted to compensate therefor.

Figure 8:
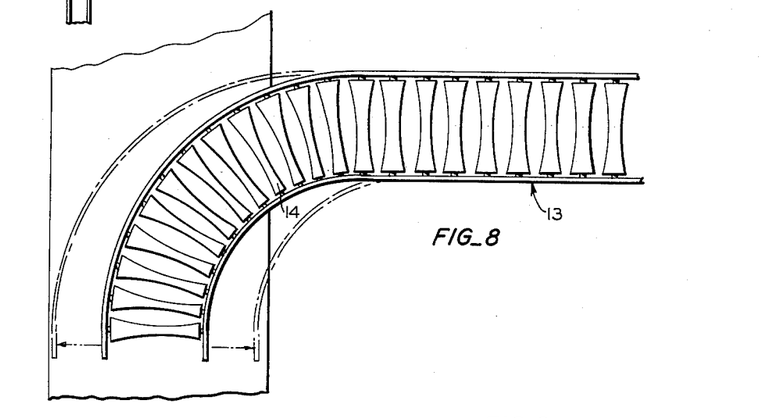
FIG. 8 is a plan view of other details of the conveyor construction.
Figure 9:
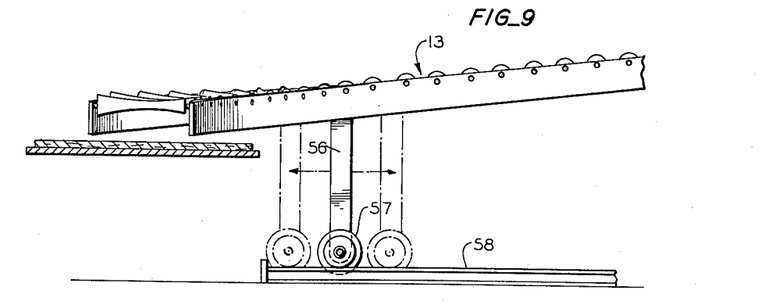
FIG. 9 is a side elevation of the conveyor construction of FIG. 8.

A further modification of means for compensating for tide conditions and changes in vessel draft is illustrated in FIGS. 8 and 9. This modification desirably is provided at the lower end of conveyor section 13 of the arrangement which employs a curved conveyor portion 14 to change the direction of travel of the respective paper rolls. As shown in FIG. 9, a suitable strut 56 having wheels 57 mounted on its bottom which are positioned for rolling movement on tracks 58 may be employed with the conveyor section to permit transverse movement of the lower portion of the conveyor section relative to the axis of the vessel in the manner illustrated by the phantom lines in FIGS. 8 and 9. In this way tide conditions and changes in vessel draft can be compensated for without damage to the conveyor arrangement chosen. Various other means also may be employed for this purpose with the particular means employed being a matter of choice to meet a particular need.

In a roll handling system of the type described, paper rolls at the point of manufacture may be imparted with identifying descriptive material, such as photo sensitive bands extending therearound, which indicate the quality, weight, consignee and the like of the individual rolls. By employing electrical console type control panels presently available, rapid handling of the individual rolls and loading the same into a given storage area of a vessel or unloading the same into a given bay of a storehouse may be rapidly and automatically effected by a minimum number of personnel.

While modifications of the overall material handling system disclosed herein, and the handling method and vessel employed in such system may become apparent to one skilled in the art, the invention should be interpreted in light of the appended claims.

We claim:

1. A method of loading and unloading a plurality of cylindrical, rollable articles into the cargo holds of a water-borne vessel comprising conveying articles in the direction of their axes and on their sides to adjacent the vessel, positioning elevator means transverse to the vessel and adjacent each cargo hold thereof, transferring the articles in end-to-end relationship onto the elevator means from adjacent the vessel so as to form a row thereon with the articles being on their sides and extending transverse to the vessel, the hold being divided into a plurality of horizontally disposed and vertically spaced storage decks, lowering the articles on the elevator means to a predetermined deck; trimming the entire vessel so as to lower one end of each of the storage decks so that the row of articles roll as a unit from the elevator means onto each storage deck, continuing the transfer of rolls by the elevator means to the deck until the deck is completely loaded, loading each deck in like manner until the hold is filled, loading each hold in like manner until the vessel is filled and trimming the vessel to the horizontal plane for transport and unloading said vessel after transport by trimming the vessel in the opposite direction to raise the ends of said storage decks to allow the rolls of articles to roll as a row onto the elevator means to each cargo hold and be transported to the upper deck adjacent each cargo hold and transferring said articles from the vessel.

2. A method of loading and unloading a plurality of cylindrical, rollable articles into the cargo holds of a water-borne vessel comprising conveying articles in the direction of their axes and on their sides to the vessel, positioning conveying means transverse to the vessel and adjacent each cargo hold of the vessel, transferring the articles in end-to-end relationship onto the conveying means so as to form a row thereon, transferring a row of articles on their sides in a direction transverse to their axes from said conveying means to elevator means in each hold, the hold being divided into a plurality of horizontally disposed and vertically spaced storage decks, lowering the articles on the elevator means to a predetermined deck; trimming the entire vessel so as to lower one end of each of the storage decks so that the row of articles roll as a unit from the elevator means onto each storage deck, continuing the transfer of rolls by the elevator means to the deck until the deck is completely loaded, loading each deck in like manner until the hold is filled, expansible dunnage means in each of said storage decks to maintain the rolls of articles in a stationary position during transport, loading each hold in like manner until the vessel is filled and trimming the vessel to the horizontal plane for transport and unloading said vessel after transport by trimming the vessel in the opposite direction to raise the ends of said storage decks to allow the rolls of articles to roll as a row onto the elevator means in each cargo hold and be transported to the conveyor means on the upper deck adjacent each cargo hold and conveying said articles from the vessel.

3. A cargo vessel comprising a hull and upper deck, said hull divided into a plurality of discrete cargo spaces spaced one from another by transverse bulkheads, each space comprising substantially the width of the vessel and a portion of its length and of substantially the depth of the hull, a plurality of horizontal spaced decks having at least one free edge and vertically positioned in each of said cargo spaces and secured to at least one bulkhead and dividing said space into a plurality of separate 'tween deck storage areas, elevator means in each of said cargo spaces positioned adjacent another bulkhead and adjacent said free edges of said horizontal decks, said elevator means extending substantially the transverse width of said cargo space and of said decks for supporting and vertically carrying a plurality of cylindrical rollable articles positioned end-to-end in a row thereon, conveyor means on the upper deck for feeding a plurality of the rollable articles to each of said cargo spaces in close proximity to said elevator means in each cargo space, ejector means adjacent said deck conveyor for transferring said rolls from said deck conveyor to said elevator means, transfer means on said elevator means for moving said rollable articles from said elevator to said decks, and vessel trimming means positioned fore and aft to permit controlled inclination of said hull and spaced cargo decks from the horizontal to permit gravity loading of said decks from said elevator means and unloading of said spaced decks to said elevator means with said rollable articles.

4. A cargo vessel comprising a hull and upper deck, said hull divided into a plurality of discrete cargo spaces spaced one from another by transverse bulkheads, each space comprising substantially the width of the vessel and a portion of its length and of substantially the depth of the hull, a plurality of horizontal spaced decks having at least one free edge and vertically positioned in each of said cargo spaces and secured to at least one bulkhead and dividing said space into a plurality of separate 'tween deck storage areas, elevator means in each of said cargo spaces positioned adjacent another bulkhead and adjacent said free edges of said horizontal decks, expansible dunnage means positioned adjacent other bulkheads in said 'tween deck storage areas and extending substantially the length of said 'tween decks, means for expanding the dunnage means in each cargo space to maintain the articles on said 'tween decks in fixed position and contracting means for said dunnage to permit release of said articles, said elevator means extending substantially the transverse width of said cargo space and of said decks for supporting and vertically carrying a plurality of cylindrical rollable articles positioned end-to-end in a row thereon, conveyor means on the upper deck for feeding a plurality of the rollable articles to each of said cargo spaces in close proximity to said elevator means in each cargo space, ejector means adjacent said deck conveyor for transferring said rollable articles from said deck conveyor to said elevator means, transfer means on said elevator means for moving said rollable articles from said elevator to said decks, and vessel trimming means positioned fore and aft to permit controlled inclination of said hull and spaced cargo decks from the horizontal to permit gravity loading of said decks from said elevator means and unloading of said spaced decks to said elevator means with said rollable articles.

References Cited in the file of this patent

UNITED STATES PATENTS

| | | |
|---|---|---|
| 571,389 | Pancoast | Nov. 17, 1896 |
| 1,196,700 | King | Aug. 29, 1916 |
| 1,900,867 | Olds | Mar. 7, 1933 |
| 2,181,279 | McLauthlin | Nov. 28, 1939 |
| 2,200,661 | Templeton | May 14, 1940 |
| 2,353,135 | Dorst | July 11, 1944 |
| 2,379,231 | Harrison | June 26, 1945 |
| 2,521,727 | Kappen | Sept. 12, 1950 |
| 2,605,912 | Small et al. | Aug. 5, 1952 |
| 2,669,210 | Bernhard | Feb. 16, 1954 |
| 2,755,950 | Forshey | July 24, 1956 |
| 2,819,810 | De Witt | Jan. 14, 1958 |
| 2,853,968 | McLean | Sept. 30, 1958 |

FOREIGN PATENTS

| | | |
|---|---|---|
| 295,518 | Great Britain | Aug. 16, 1928 |